United States Patent
Murdock

(10) Patent No.: US 10,473,199 B1
(45) Date of Patent: Nov. 12, 2019

(54) MECHANICAL ENERGY STORAGE SYSTEM

(71) Applicant: Nathan Murdock, Eagle, ID (US)

(72) Inventor: Nathan Murdock, Eagle, ID (US)

(*) Notice: Subject to any disclaimer, the term of this patent is extended or adjusted under 35 U.S.C. 154(b) by 0 days.

(21) Appl. No.: 16/514,590

(22) Filed: Jul. 17, 2019

Related U.S. Application Data

(63) Continuation-in-part of application No. 14/985,864, filed on Feb. 4, 2016.

(51) Int. Cl.
   *F16H 33/02* (2006.01)
   *H02K 7/18* (2006.01)
   *H02K 7/02* (2006.01)

(52) U.S. Cl.
   CPC ............. *F16H 33/02* (2013.01); *H02K 7/02* (2013.01); *H02K 7/1823* (2013.01); *F16H 2706/00* (2013.01)

(58) Field of Classification Search
   CPC ........... F03G 1/00; F03G 1/02; H02K 7/1853; H02K 7/02; H02K 7/116; H02K 7/118; F16H 33/02
   USPC ................ 290/1 E; 185/11, 38, 40 R, 43
   See application file for complete search history.

(56) References Cited

U.S. PATENT DOCUMENTS

| | | | | |
|---|---|---|---|---|
| 1,075,023 A * | 10/1913 | Creech | F03G 1/00 | 185/37 |
| 2,389,514 A * | 11/1945 | Kennedy | H02K 7/1853 | 310/75 A |
| 3,945,453 A * | 3/1976 | Black | B60K 6/10 | 180/54.2 |
| 4,020,923 A * | 5/1977 | Taylor | F03G 1/00 | 185/11 |
| 4,319,655 A * | 3/1982 | Hoppie | B60K 6/10 | 180/165 |
| 6,523,646 B1 * | 2/2003 | Gates | F03G 1/02 | 185/10 |
| 8,497,590 B2 * | 7/2013 | Williams | F03G 7/10 | 290/1 E |
| 8,813,915 B2 * | 8/2014 | Chio | F03G 1/02 | 185/10 |
| 2010/0090471 A1 * | 4/2010 | Casero Fernandez-Montes | B29C 70/44 | 290/55 |
| 2013/0207400 A1 * | 8/2013 | Hassan | F03G 1/00 | 290/1 E |
| 2014/0152019 A1 * | 6/2014 | Voorhees | H02K 7/1853 | 290/1 E |
| 2014/0284938 A1 * | 9/2014 | Xu | F03G 1/00 | 290/1 R |

(Continued)

FOREIGN PATENT DOCUMENTS

| | | | | |
|---|---|---|---|---|
| DE | 527501 C * | 6/1931 | | F03G 1/00 |
| DE | 2550199 A1 * | 5/1977 | | F03G 1/02 |
| DE | 202016002454 U1 * | 10/2016 | | F03G 1/00 |

(Continued)

*Primary Examiner* — Ruth Ilan

(57) ABSTRACT

A system and method for using electrical power and mechanical means to store and release potential energy via mechanical means to re-generate electrical power. The system functions by using externally generated electricity to power an electric motor, which by rotation through a transmission of gears, deforms a collection of springs between two plates, thereby storing electricity as potential energy, until the energy is released to a kinetic flywheel which in turn powers an electric power generator.

3 Claims, 5 Drawing Sheets

(56) References Cited

U.S. PATENT DOCUMENTS

| | | | |
|---|---|---|---|
| 2014/0375065 A1* | 12/2014 | Chan | F03G 1/00 |
| | | | 290/1 E |
| 2016/0084043 A1* | 3/2016 | Cobb | H02K 7/1853 |
| | | | 166/244.1 |

FOREIGN PATENT DOCUMENTS

| | | | | | |
|---|---|---|---|---|---|
| EP | 2672143 | A2 | * | 12/2013 | ............... F03G 1/02 |
| GB | 139126 | A | * | 2/1920 | ............... F03G 1/00 |
| GB | 2481792 | A | * | 1/2012 | ............... F03G 1/02 |
| WO | WO 96/27083 | | * | 9/1996 | |
| WO | WO-2008064714 | A1 | * | 6/2008 | ............ B29C 70/44 |
| WO | WO-2013060169 | A1 | * | 5/2013 | ............... F03G 1/00 |
| WO | WO-2014076328 | A1 | * | 5/2014 | ............... F03G 1/08 |

\* cited by examiner

MECHANICAL ENERGY STORAGE SYSTEM

BACKGROUND OF THE INVENTION

Energy storage methods have historically consisted of chemical means such as chemical batteries or gravitational means such as hydroelectric dams. More recently, for example, chemical batteries such as lithium ion batteries are being implemented on both residential and grid level scale as a means of storing renewable energy or otherwise excess energy to be deployed at times of peak demand. These chemical batteries and hydroelectric forms of storage have limitations such as geographic compatibility, storage life, and cost effectiveness; as well as environmental concerns associated with their design, production and long term use. Other forms of energy storage utilizing mechanical methods such as kinetic flywheel systems, and spring storage systems have been contemplated, with limited application. Some flywheel systems have been developed, but result in disadvantages like output run time, high maintenance and manufacturing costs and general practicality. Spring powered devices such as radios, lights and cassette players have been developed and proven practical in some applications and cost effective, although larger grid or residential sized systems have yet to be usefully developed and implemented. Hence, effort has been made to develop a system that addresses the limitations of prior methods and eliminates the adverse environmental impacts of present forms of energy storage.

FIELD OF THE INVENTION

The current invention relates to spring powered energy storage devices that enable storage of energy from various sources of electrical power input in conjunction with the ability to convert stored energy into electrical energy for any practical use.

BRIEF SUMMARY OF THE INVENTION

The present invention comprises a system and method of operation that are further described in the following Brief Description of the Drawings, the Detailed Description of the Invention, and the Claims. Other features and advantages of the present invention will become apparent from the following Detailed Description of the invention made with reference to the accompanying drawings.

DETAILED DESCRIPTION

Reference will now be made in detail to an embodiment of the present invention. One or more examples of which are illustrated in the accompanying figures. The present invention is not limited to these embodiments.

Figure 1:
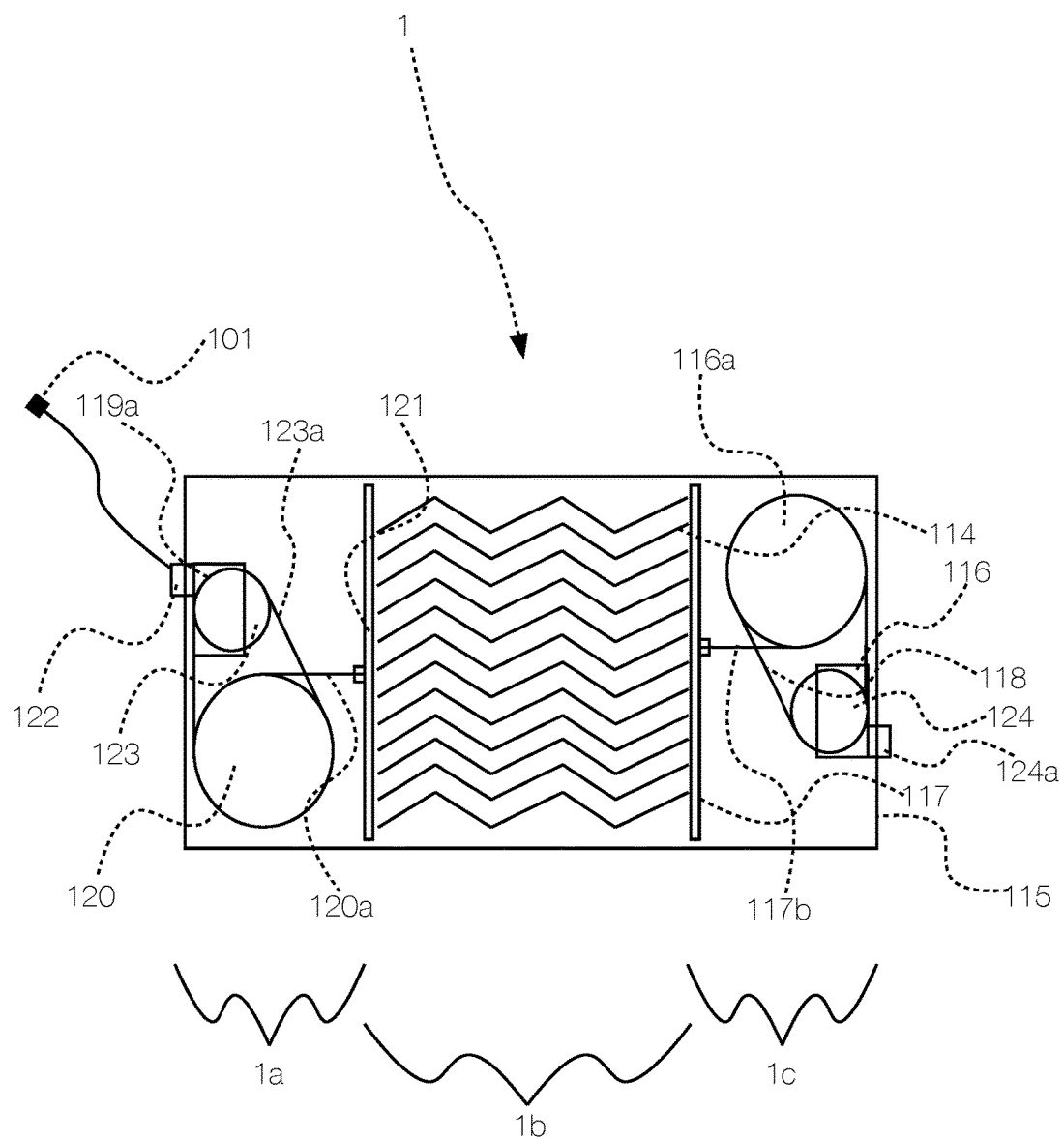
FIG. 1: A perspective overview of the present invention.

Regarding FIG. 1: This illustration identifies the System 1 comprised of the series of included components: The winding construct "WC" 1a comprised of: an external source of electrical energy whereby at lease one of the following sources: a series of solar panels, wind generators, a geothermal power system, a hydro-electric power generation system, nuclear generation system, or a tidal power system 101, is connected to the electrical connector 122, which is then connected to the electric motor 119a, which turns the initial drive gear 123. This initial drive gear 123 is combined with a drive chain 123a, which turns the ratcheting gear 120. The ratcheting gear 120 provides a progressive locking action similar to a bicycle hub, allowing for uni-directional input. In addition, the ratcheting gear 120 can be released to rotate freely upon recharge and works in conjunction with a connected cable 120a that winds around the ratcheting gear and is also connected to the storage construct "SC" 1b at the plate A 121. The storage construct "SC" comprised of a plate A 121 for attaching springs 114, which plate A 121 is duplicated 117 on the other end of the storage construct "SC" and connected to the other end of the springs 114 and is then connected to another cable 117b which is connects the storage construct "SC" to the generator construct "GC" 1c. The generator construct "GC" 1c comprised of a ratcheting drive gear 116a, which can be released to spin freely upon recharge and drives the drive input flywheel 124 via a chain 118, The drive input flywheel 124 includes a ratchet mechanism similar to a bicycle hub, which allows for bursts of uni-directional input. The drive input flywheel 124 drives the electric power generator 116 via an integrated cogwheel 501 (See FIG. 5); which electric power generator provides electricity supply via output connectors 124a.

Figure 2:
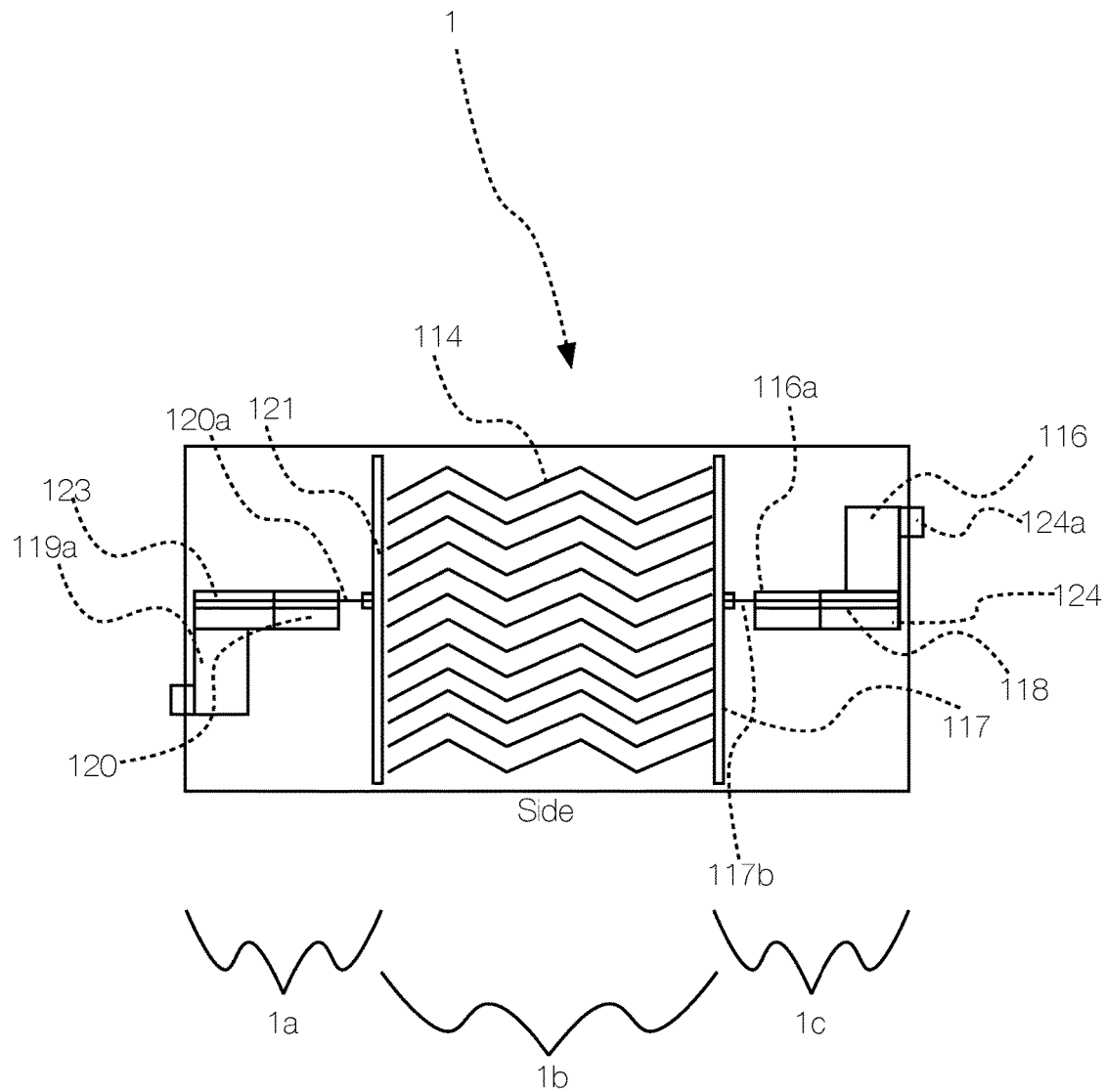
FIG. 2: A side perspective overview of the present invention.

Regarding FIG. 2: A side view of the embodiment illustrated in FIG. 1. Where the electric motor 119a is shown connected to the initial drive gear 123. Which drives the ratcheting gear 120, which winds the cable 120a, which moves the plate A 121, which make up the winding construct "WC" 1a, which by winding the cable 120a, manipulates the springs 114 which are connected to plates A & B, 121 and 117 respectively, plate A, plate B and springs constituting the storage construct "SC". The cable 117b connects the storage construct "SC" 1b to the generator construct "GC" 1c via the ratcheting drive gear 116a, which utilizes a chain 118 to drive the drive input flywheel 124, which drives the electric power generator 116. Electrical power generated by the electric power generator is output via the output connectors 124a.

Figure 3:
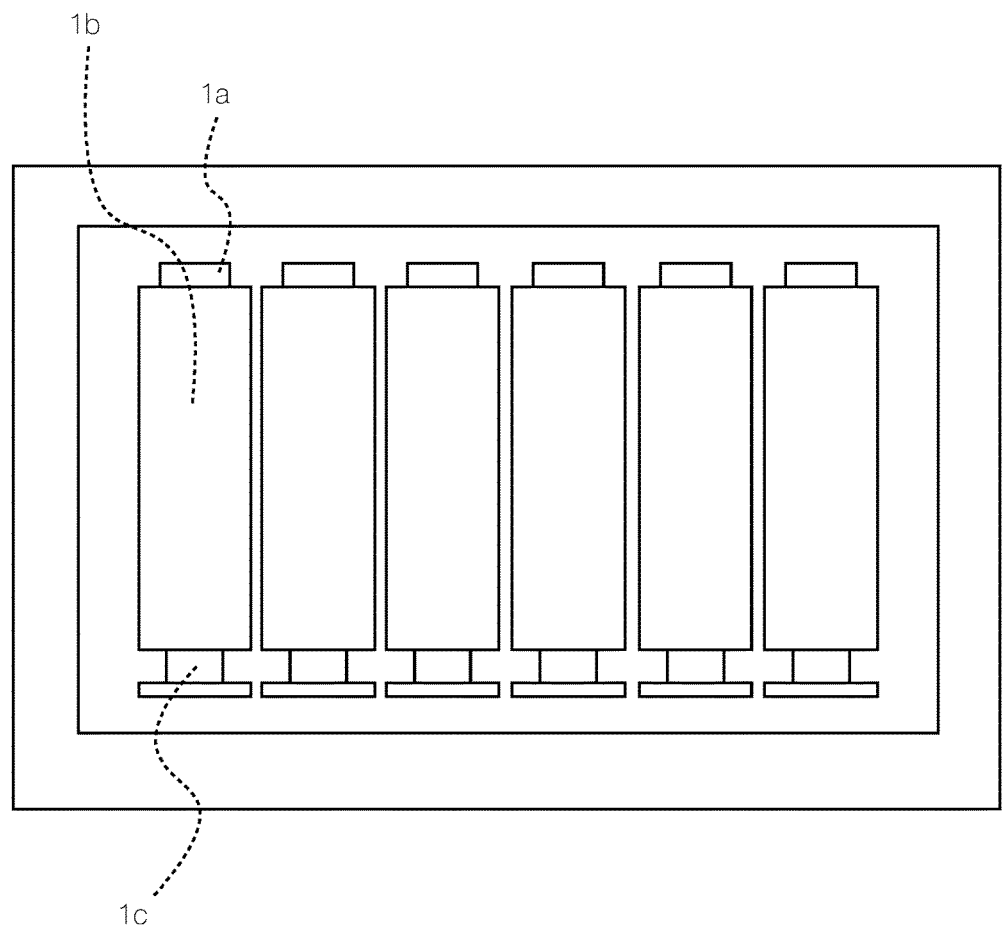
FIG. 3: A perspective view of a collection of devices arranged in a building space.

Regarding FIG. 3: A top view of a large-scale configuration of a series of six systems in a building. Each system being made up of a winding construct 1a, a storage construct 1b, and a generation construct 1c.

Figure 4:
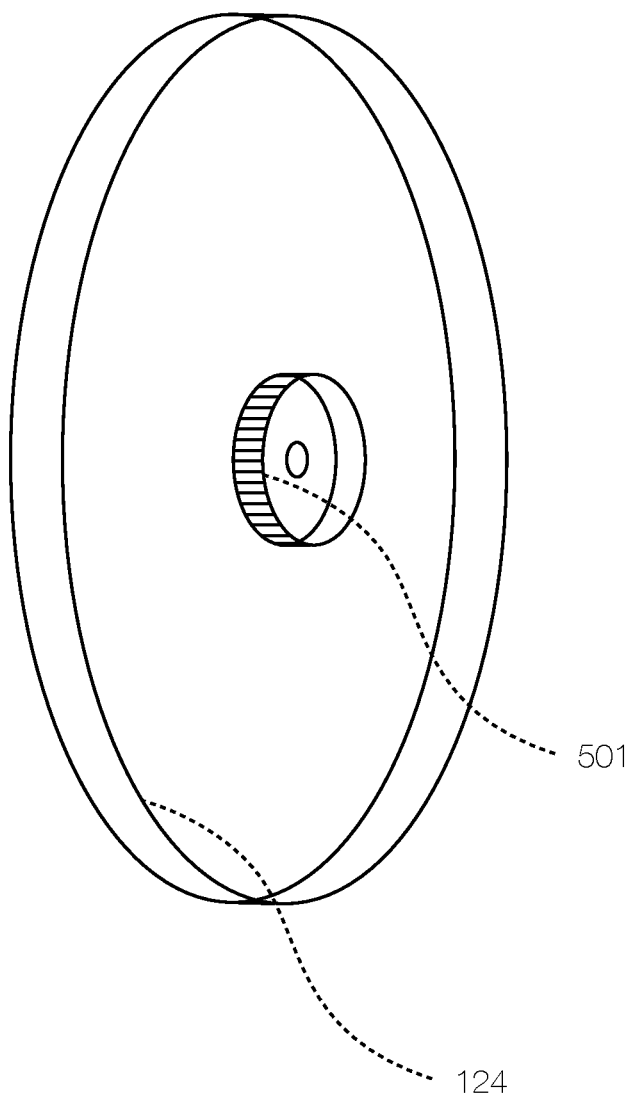
FIG. 4: An illustration of a typical flywheel with cogwheel included.

Regarding FIG. 4: an expanded view of the flywheel 124, for clarification regarding the integrated cogwheel 501. This flywheel is typical in nature and design.

Figure 5:
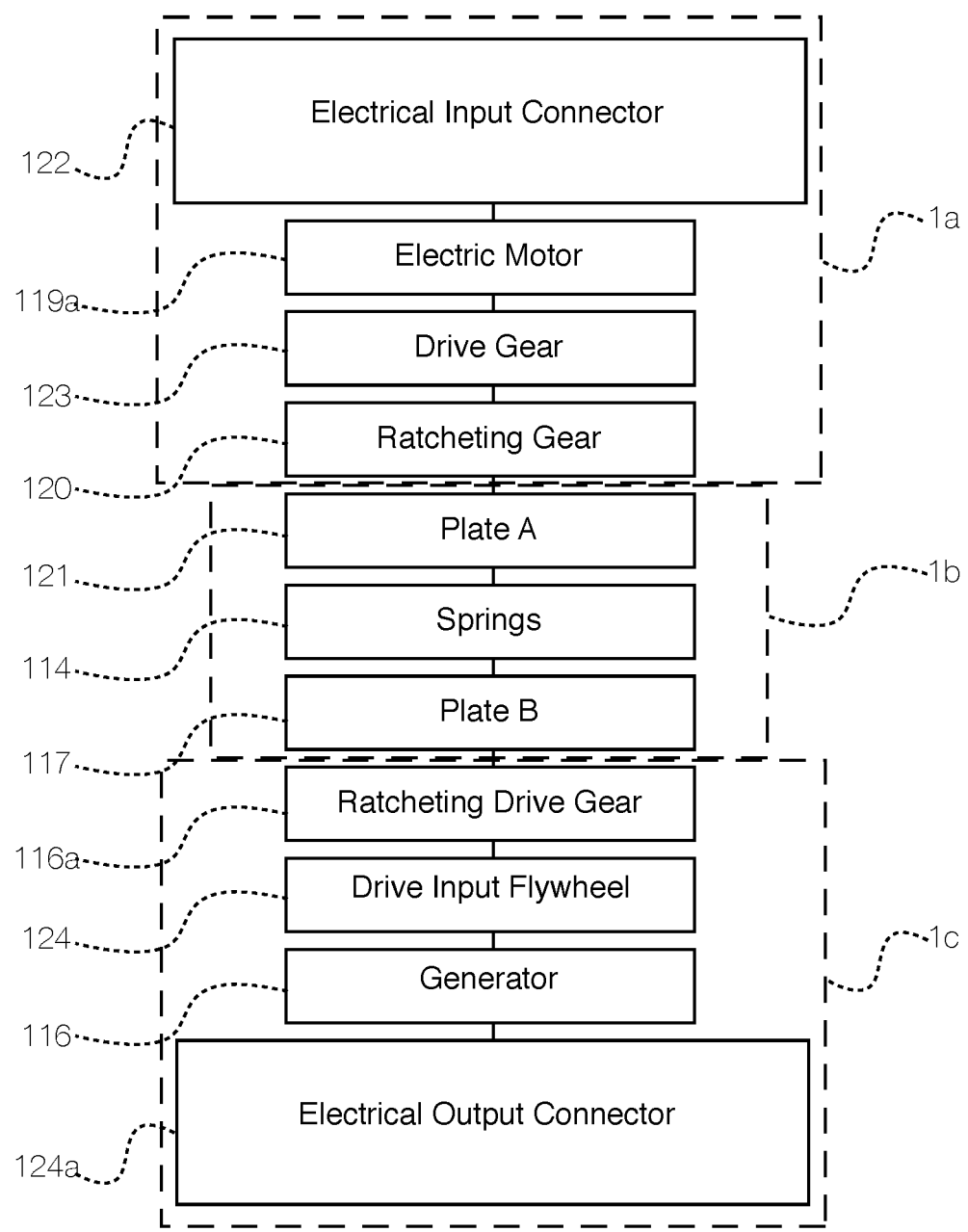
FIG. 5: A flowchart representation of a method in accordance with an embodiment of the present invention.

Regarding FIG. 5: A flowchart representation of a method in accordance with an embodiment of the present invention, wherein the method functions by way of direct current electrical source is the input energy, which is connected to the electrical input connector 122, which is connected to the electric motor 119a, which powers the drive gear 123, which via a chain turns the ratcheting gear 120; the ratcheting gear is then wound with a cable connected to the plate A 121, which is connected to the springs which are connected to the plate B 117, which plates A & B and the springs constitute the storage construct; which storage construct is connected to the ratcheting drive gear 116a, which via a chain drives the drive input flywheel 124, which turns the electric power generator 116, providing Electrical power to the electrical output connector.

The direct current motor is used to reset the system for recharge by reversing the polarity and therefor reversing the direction of rotation, pushing the storage construct back to the starting position The storage system of the present invention has the following advantages:

1. The system in agnostic to the type of electrical energy generation and so can be used with many types of electrical energy input, whether wind, solar, traditional ICE combustion, nuclear or otherwise yet to be developed technologies.
2. The system can release stored energy at any time, as dictated by the user.
3. The system does not require chemicals and therefor does not pose a substantial risk of fire or chemical spill. A breakdown of the system is limited to mechanical failure of one or more components only.
4. The system may be used by a residence, a community of multiple residences, a city, a regional or national grid, a business, Business Park or a collection of electrically powered equipment.
5. The system can be transported by air, land or sea and can be configured in many arrangements and sizes.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by components, mechanical, hydraulic or other elements and the like or any combination thereof Many changes and modifications to the above-described embodiment of the invention can, of course, be carried out without departing from the scope thereof. Accordingly, to promote the progress in science and the useful arts, the invention is disclosed and is intended to be limited only by the scope of the appended claims.

The invention claimed is:

1. An apparatus comprising:

A system of electricity storage and generation, the system including,

A winding component comprising a direct current external source of electrical energy that powers an electric motor, which turns a drive gear that is connected by chain to a ratcheting gear, which winds a cable that pulls a storage construct comprising a plate connected to a plurality of springs, thereby manipulating the connected springs, thereby storing energy via spring tension, which system then releases the stored energy via a generation construct wherein a cable connects a second plate connected to the springs to a ratcheting drive gear, which via a chain, drives a flywheel which powers an alternating current electric power generator for the purpose of converting the stored energy back into electrical energy.

2. The apparatus of claim 1 wherein the direct current external source of electrical energy includes at least one of a series of solar panels, wind generators, a geothermal power system, a hydro-electric power generation system, nuclear generation system, or a tidal power system.

3. The apparatus of claim 1 wherein the electric motor is used to reset the system for recharge by reversing the polarity and therefor reversing the direction of rotation, pushing the storage construct back to the starting position.

* * * * *